United States Patent
Miller et al.

(10) Patent No.: US 7,124,199 B2
(45) Date of Patent: Oct. 17, 2006

(54) TURN RESTRICTION HANDLING ENHANCEMENT

(75) Inventors: Martin Miller, Calgary (CA); Kevin Glen Robinson, Calgary (CA)

(73) Assignee: Autodesk, Inc., San Rafael, CA (US)

( * ) Notice: Subject to any disclaimer, the term of this patent is extended or adjusted under 35 U.S.C. 154(b) by 873 days.

(21) Appl. No.: 10/330,874

(22) Filed: Dec. 27, 2002

(65) Prior Publication Data

US 2003/0140022 A1    Jul. 24, 2003

Related U.S. Application Data

(60) Provisional application No. 60/344,103, filed on Dec. 28, 2001.

(51) Int. Cl.
*G06F 13/00* (2006.01)

(52) U.S. Cl. .................... 709/238; 709/220; 709/223; 709/249; 370/395.32

(58) Field of Classification Search .................... None
See application file for complete search history.

(56) References Cited

U.S. PATENT DOCUMENTS 6,031,835 A * 2/2000 Abali et al. .................. 370/388
6,038,509 A * 3/2000 Poppen et al. ............... 701/210
6,101,181 A * 8/2000 Passint et al. ............... 370/352
6,185,612 B1 * 2/2001 Jensen et al. ................ 709/223

OTHER PUBLICATIONS

Yang et al, "Adaptive Routing in Irregular Wormhole-routed Networks", Proceedings of 11th Annual International Symposium on High Performance Computing Sysstems, Jul. 1997, p. 308-318.*
Caldwell, "On Finding Minimum Routes in a Network with Turn Penalties," Communications of the ACM, 1961, 107-108.
http://ciips.ee.uwa.edu.au/~morris/Year2/PLDS210/dijkstra.html, "Dijkstra's Algorithm," John Morris, 1998, 3 pp.

* cited by examiner

*Primary Examiner*—Viet D Vu
(74) *Attorney, Agent, or Firm*—Gates & Cooper LLP (57) ABSTRACT

A method, apparatus, and article of manufacture determine a path on a network. A Global search is commenced for one or more Global paths on the network. Thereafter, when a turn restriction on a first node on the network exists, a hidden node that is not reachable from the first node due to the turn restriction is detected. A Local search commences from the hidden node in a reverse direction creating a Local search path. When the Local search can connect to the Global search, the Local search path is converted to a new Global path, and added as an alternative to the Global search.

30 Claims, 3 Drawing Sheets

TURN RESTRICTION HANDLING ENHANCEMENT

CROSS-REFERENCE TO RELATED APPLICATIONS

This application claims the benefit under 35 U.S.C. Section 119(e) of the following and commonly assigned U.S. provisional patent application, which is incorporated by reference herein:

Provisional Application Ser. No. 60/344,103, filed Dec. 28, 2001, by Martin Miller and Kevin Robinson, entitled "TURN RESTRICTION HANDLING ENHANCEMENT,".

BACKGROUND OF THE INVENTION

1. Field of the Invention

The present invention relates generally to network search algorithms, and in particular, to a method, apparatus, and article of manufacture for improving the handling of turn restrictions in a network search algorithm.

2. Description of the Related Art

Computer systems are often used to provide directions or paths to a destination. To provide the best/shortest path to a destination, network trace algorithms are commonly used. Network trace algorithms such as a standard Dijkstra algorithm and A* algorithm operate on a model (referred to as a net trace model) in the form of a mathematical graph that is constructed using links (that represent street/road segments) and nodes (that represent intersection and road ends). However, when turn restrictions are introduced, which represent physical and/or legally enforced restrictions (e.g., "no left turn"), the algorithm(s) potentially miss some best paths because the turn restrictions can hide a path that could be followed if the node (intersection) was entered via another link (road). In other words, if a turn restriction is encountered at a node, a node that may be reached but for the turn restriction (referred to as a hidden node) may not be examined. However, such a hidden node may be reached via a different link/road. Accordingly, the best/shortest path may not be found. To address such turn restrictions, a transformed graph approach may be utilized. However, this approach has several disadvantages. These problems may be better understood by describing network search algorithms, turn restrictions, and the transformed graph approach.

Network Search Algorithms

Dijkstra's algorithm was introduced in 1959 and provides a method for solving the shortest-path problem. In a network, it is frequently desired to find the shortest path between two nodes. The weights attached to the edges can be used to represent quantities such as distances, costs, or times. Dijkstra's algorithm is used to find the minimum distance from one given node of a network, called the source node or start node, to all the nodes of the network. In general, the distance along a path is the sum of the weights of that path. The minimum distance from node A to node B is the minimum of the distance of any path from node A to node B. Thus, all paths and their associated distances (also referred to as costs) are determined and the minimum path is then determined.

The A* algorithm is very similar to Dijkstra, but it uses a heuristic function to help prioritize what nodes are searched next. This results in far fewer total nodes being examined before a specific destination node is found. If the heuristic guarantees to always underestimate the actual value, then it can be shown that applying the heuristic continues to find the best route. An example of a heuristic function that satisfies this requirement is the straight-line distance from the examined node to the end point.

Turn Restrictions

Turn restrictions ate part of the net trace model. They are based on network data and are loaded from a database at the same time as the other model information (links and nodes). Each turn restriction identifies a case where it is prohibited to continue a route from one link to another at a specific node. Further, turn restrictions are typically used to represent real life traffic restrictions at specific intersections, where one or more turns are not allowed.

Although turn restrictions may have been supported in the prior art, and all the calculated routes may "obey" them correctly, there is a limitation. The problem with the prior art processing of turn restrictions is that a turn restriction may prevent a full expansion of a node. In other words, not all links leading out of a node may be considered for the best path, depending on which link was used to arrive at the node. Once the node is expanded, however, under the prior art, a re-entry to the same node (via a different link) is prevented, so that some 'best routes' may not be found.

Transformed Graph Approach

The transformed graph approach for handling turn restrictions is more fully described in T. Caldwell, *On finding Minimum Routes in a Network with Turn Penalties*, Communications of the ACM 4(2), 1961, which is incorporated by reference herein. In the transformed graph approach, a road network is transformed into a new network. During this transformation, links in the road network become nodes in the transformed network. Additionally, any two nodes in the transformed network are connected by links if: (1) the corresponding links in the road network are connected at a common node; and/or (2) there is no turn restriction prohibiting traversal from between the corresponding links in the road network.

One advantage of the transformed graph approach is that search algorithms can be used without modification on the transformed network to find minimum cost routes that honor all turn restrictions. However, there are many disadvantages. For example, the original network must be transformed either ahead of time, or at runtime. Further, routes calculated from the transformed network must be translated back into the original network. Additionally, the transformed network is significantly larger than the original network. Accordingly, since runtime performance of the search algorithm is a function of network size, the search algorithms run significantly slower on the transformed network than on the original network.

SUMMARY OF THE INVENTION

One or more embodiments of the invention provide a method, apparatus, and article of manufacture for solving the problem of the best path(s) being possibly missed by an algorithm due to turn restrictions. Any nodes that are hidden by the fact that a turn restriction is being applied are detected. A parallel Local search is started from the hidden node in a reverse direction, looking for a "loopback", connecting to the Global search. The Global search and the Local search proceed in parallel one step at a time.

The Local search keeps track of the visited nodes as well as the links that were used to arrive at the nodes, to ensure that nodes can be revisited using all of the possible links. If the hidden node is found by the Global search or a maximum number of steps predefined for the Local search is reached, the Local search is abandoned. Further, if a loopback from the hidden node to the Global search is found, the Local search path is converted to a Global path, it is added (as an alternative) to the Global search, and the Local search is complete.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to process turn restrictions to fully utilize and find all possible paths to/from a node. Accordingly, the invention avoids the above-described problems by allowing, under certain conditions, reentry of nodes to fully utilize all possible links leading out of each node.

Hardware Environment

Figure 1:
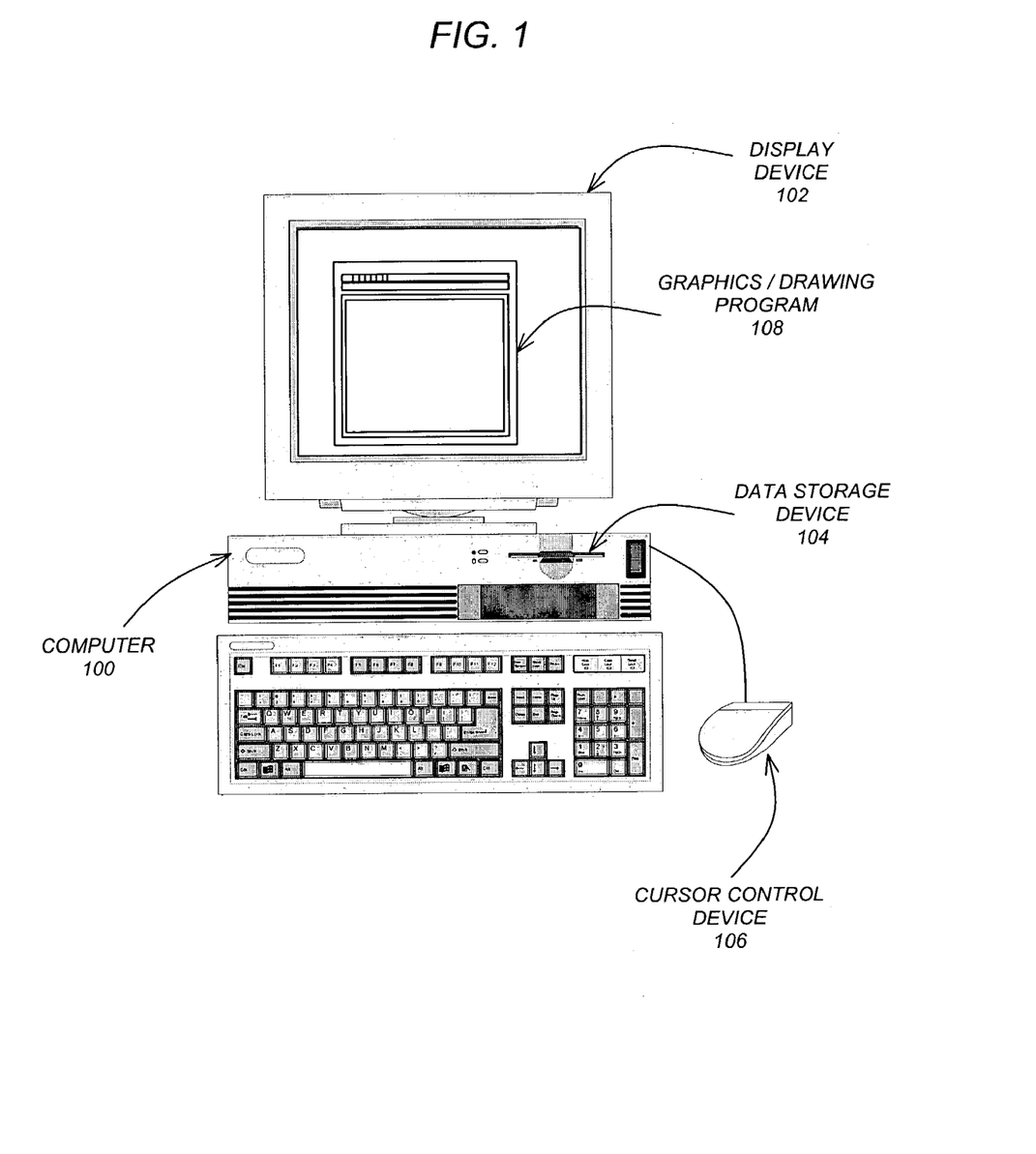
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

Embodiments of the invention may also be implemented on a distributed computer system using a network to connect multiple computers 100 together (e.g., client computers to server computers). In this regard, a typical combination of resources may include a network comprising the Internet, LAN (Local area network), WAN (wide area network), or the like, clients that are personal computers or workstations, and servers that are personal computers, workstations, minicomputers, or mainframes.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Software Embodiments

To determine the most appropriate path on a network, the computer 100 (e.g., the graphics program 108), conducts a Global search to find multiple alternative Global paths that can be used to arrive at a given destination. The alternative Global paths and their costs may then be evaluated to select a particular path for use/recommendation.

Figure 2A:
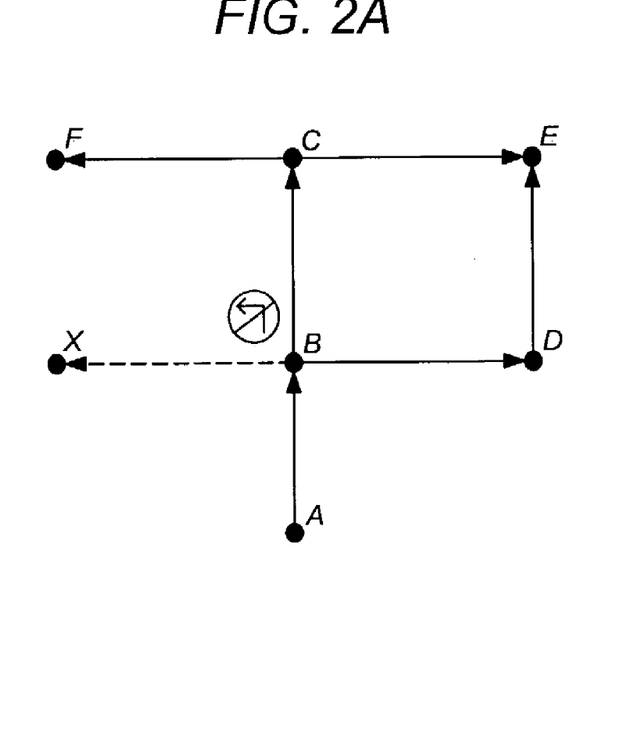
FIG. 2A illustrates nodes and links for a Global search on a network in accordance with one or more embodiments of the invention.

To determine a path on a network, the Global search commences by individually examining one or more nodes to find links to subsequent nodes. Accordingly, a node is expanded to find all links that lead out of the node. In the prior art, when a node is expanded, a list of applicable links leading out of the node is retrieved (e.g., via a getLinksForNode call). However, links that cannot be entered due to turn restrictions are filtered out and are not returned. FIG. 2A illustrates nodes A–F and X with links to each of the nodes. As illustrated, a turn restriction exists at node B such that the link BX cannot be followed directly from Link AB. Thus, in the prior art, link BX will be filtered out and not returned when expanding node B. This example illustrates how a turn restriction can limit the evaluation of particular links/nodes.

In one or more embodiments of the invention, instead of returning one list of links, two lists are returned: (1) an eligible list—the same list as in the prior art, containing all the links that can be used to travel out of the node (i.e., excluding links that have been filtered out due to turn restrictions); and (2) a pending list—list of all the links that would be applicable in all other respects except for the turn restrictions.

The global search keeps a Closed list and an Open list. The Closed list contains those nodes that have already been evaluated/expanded. The Open list contains those nodes that have been reached but have not yet been evaluated/expanded.

Hidden Nodes

As described above, the pending list contains links that cannot be followed due to a turn restriction. Accordingly, the node (e.g., node X) pointed to by the link in the pending list (i.e., the node at the other end from the current node being examined) cannot currently be reached due to the turn restriction. Such a non-reachable node is referred to as a "hidden node".

For each link in the pending list, the hidden node is excluded from further expansion. Accordingly, hidden nodes are not placed on the Open list since the hidden node is not reachable at this point. However, it is desirable not to loose track of this hidden node because it could still be reached if the current node is re-entered via another link.

Parallel Local Search

For each hidden node encountered, a separate Local search is started/initialized, with its own Search Space (Open/Closed list), going backwards. Since the Global trace (i.e., the original path determination that excludes examination of hidden nodes) and the Local backward search expand concurrently, one step at a time, both ways are effectively searched for a loop that would close the gap created by the turn restriction.

To make sure that all of the possible ways of connecting back to the Global search are examined, the Local search may use directed nodes. Such directed nodes may be based on an identification (ID) and a link used to enter the node instead of just an identification. Accordingly, the directed nodes may take into consideration not only each node but also which link was used to reach the node.

In more detail, when a pending link is returned and a hidden node is encountered, various steps may be performed. Initially, a new Local search may be obtained/initialized, with its own search space (Open/Closed list). Nodes are created for the hidden node and the current node and placed on Local Closed and Open lists, respectively.

In the subsequent search steps, the Local Open list is expanded (using a reverse search) in parallel with the Global list. After each step, a check is made to determine if the hidden node has been reached via the Global search. When the hidden node has been reached, the node is no longer "hidden" and the Local search is cancelled. For each node in the Local search, a check is made for a connection between the Global and the Local search. In other words, it is determined whether there is a way to continue the path at that node by switching from the Global path to the Local path.

Once a connection between the Global search and the Local search is found, the connecting path is retraced, placing any re-entered nodes as directed nodes on the Global search Closed list and the Local search is ended.

EXAMPLE

The present invention may be better illustrated by example using the nodes and links of FIG. 2A. In FIG. 2A, the path starts with node A. Accordingly, node A is placed on the Global Open list as illustrated in Table 1.

TABLE 1

| Global | | Local | |
|---|---|---|---|
| Closed | Open | Closed | Open |
| | A | | |

Node A is then expanded resulting in the placement of node B on the Global Open list as illustrated in Table 2.

TABLE 2

| Global | | Local | |
|---|---|---|---|
| Closed | Open | Closed | Open |
| A | B | | |

The Global search continues with the expansion of the first node on the Global Open list—node B. By expanding node B, nodes X, C, and D are found. However, due to the turn restriction, node X cannot be reached. Since link BX cannot be taken due to the turn restriction, the link BX is placed in the pending list.

Accordingly, a new Local search is created with a Local Open/Closed list. Directed nodes X' and B' are created, and X' is placed on the Local Closed list and B' on the Local Open list as illustrated in Table 3.

TABLE 3

| Global | | Local | |
|---|---|---|---|
| Closed | Open | Closed | Open |
| A | B | X' | B' |

Figure 2B:
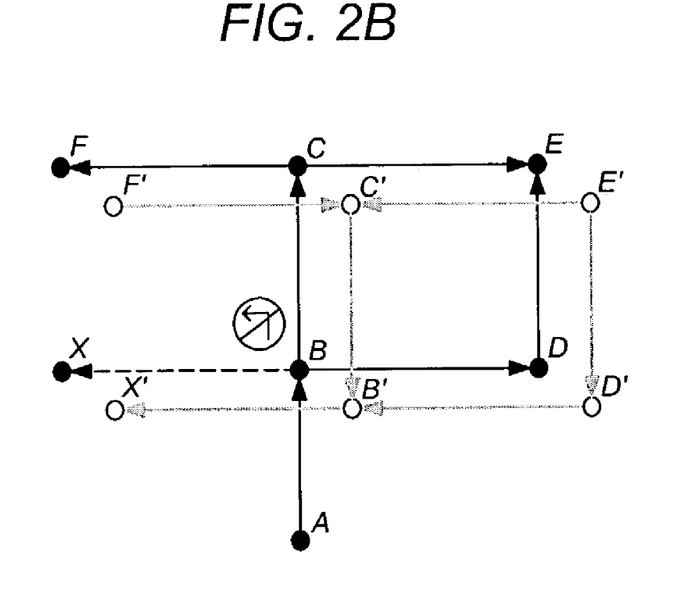
FIG. 2B illustrates a Local search path in view of the Global search path of FIG. 2A.

FIG. 2B illustrates the Local search path in view of the Global search path of FIG. 2A. The next search step is performed with both the Global and Local lists in parallel. From the Global search, node B is expanded resulting in nodes C and D. From the Local Open list, node B' is expanded resulting in nodes C' and D'. The results are illustrated in Table 4.

TABLE 4

| Global | | Local | |
|---|---|---|---|
| Closed | Open | Closed | Open |
| A, B | C, D | X', B' | C', D' |

Note that in Table 4, A' is not placed on the Local Open list, since the application is currently in reverse mode and the link BX cannot follow AB.

Once node B and node B' have been expanded, node X is checked to determine if it has been reached via the Global search. In this example, the answer is no. Thereafter, the Local Open list is checked to determine if any of the shadow nodes can connect to the Global search. In this example, the answer is no (assuming a U-turn is not allowed in nodes B, C, D, and E).

The next search step is performed with both the Global and Local lists, wherein nodes C and C' are expanded. The lists subsequently appear as illustrated in Table 5.

TABLE 5

| Global | | Local | |
|---|---|---|---|
| Closed | Open | Closed | Open |
| A, B, C | D, E, F | X', B', C' | D', E', F' |

Once expanded, node X is checked to determine if it has been reached via the Global search (resulting in a negative answer at this point). Thereafter, the Local Open list is checked to determine if any of the shadow nodes in the Local Open list can connect to the Global search (also resulting in a negative determination).

At this stage, the next search step is performed with both the Global and Local lists, wherein nodes D and D' are expanded and the lists subsequently appear as illustrated in Table 6.

TABLE 6

| Global | | Local | |
|---|---|---|---|
| Closed | Open | Closed | Open |
| A, B, C, D | E, F | X', B', C', D' | E', F', E' |

As illustrated in Table 6, note that when node D is expanded, a second copy of node E is not placed on the Global Open list. A second copy of node E', however, is placed on the Local Open list, since the Local search algorithm uses directed nodes and node E' was entered via a different link this time.

Node X is again checked to determine if it has been reached via the Global search (resulting in a negative determination). The Local Open list is then checked to determine if any of the shadow nodes in the Local open list can connect the Global to the Local search. At this stage, reaching node E from node C can be connected with reaching (backwards) node E' from node D'. Accordingly, the determination is positive and the two arcs are connected by placing the directed nodes D' and B' on the Global Closed list with updated costs and previous node pointers. Node X is updated with a previous node pointer to B' and the whole Local search is ended. Table 7 illustrates these results.

TABLE 7

| Global | | Local | |
| --- | --- | --- | --- |
| Closed | Open | Closed | Open |
| A, B, B', C, D, D', E | X, F | | |

If there was a link FX and node X was reached before the loop-back of the Local search was found, then the Local search would be cancelled. Further, in any case, the Global search continues as normal, without the turn restriction having any more impact.

Logical Flow

Figure 3:
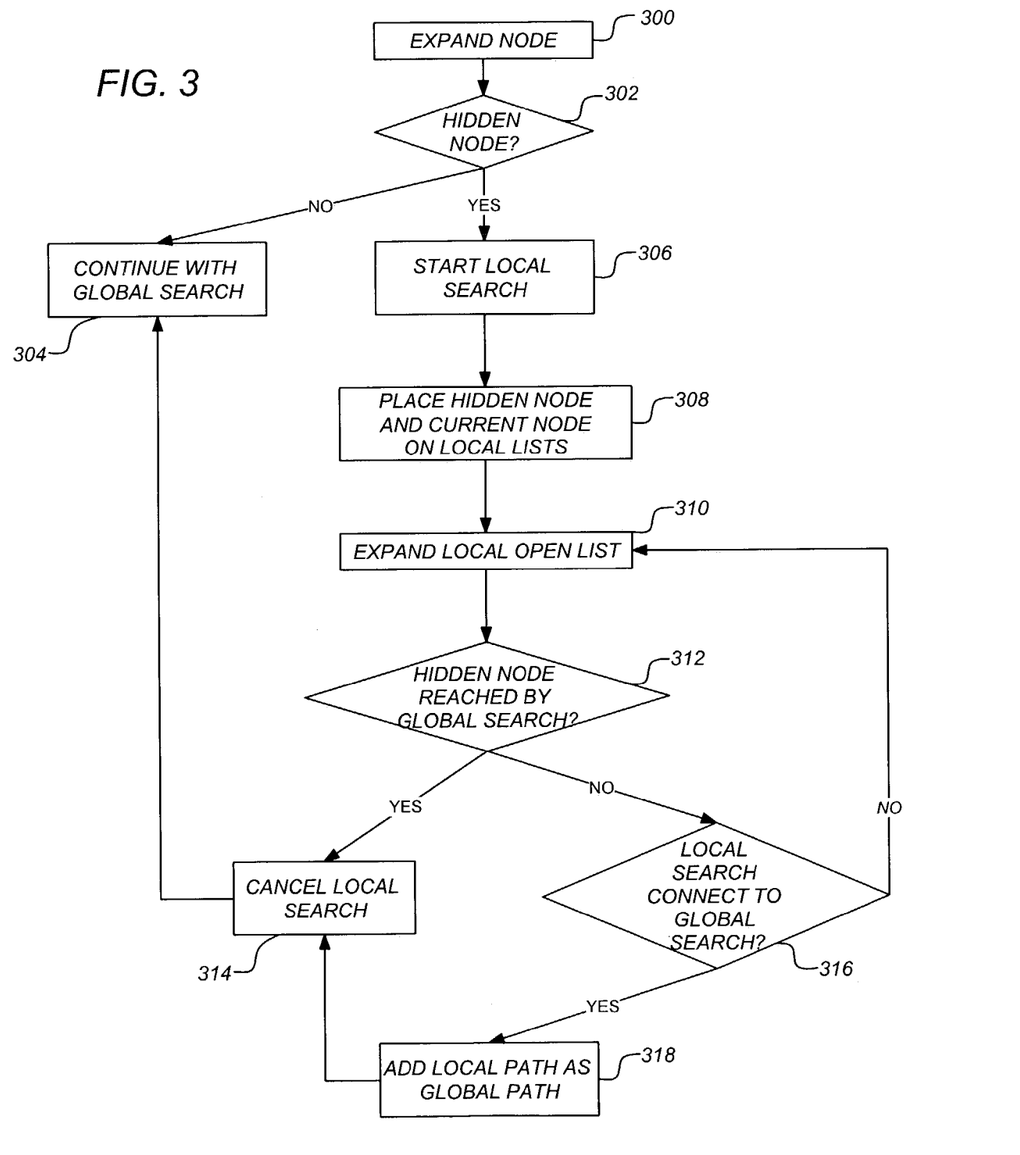
FIG. 3 is a flow-chart illustrating the logical flow for conducting a search in accordance with one or more embodiments of the invention.

FIG. 3 is a flow-chart illustrating the logical flow for conducting a search in accordance with one or more embodiments of the invention. At step 300, a global search is commenced for one or more potential global paths on a network. To commence the search, a first node is expanded. At step 302, a determination is made regarding whether a turn restriction on the first node exists. In other words, the system detects whether a hidden node that is not reachable from the first node due to the turn restriction exists. As described above, to detect if a hidden node exists, an eligible list that comprises a first list of all links that can be used to travel out of the first node is obtained. Further, a pending list that comprises a second list of all of the links that would be applicable to the first node in all other respects except for the turn restriction is obtained. If the pending list has an entry (i.e., is not empty), a hidden node exists. Thereafter, if a hidden node is not detected, the Global search continues at step 304.

If a hidden node is detected, a Local search is commenced from the hidden node in a reverse direction to create a local search path at step 306. During the Local search, shadow nodes (i.e., the hidden node and current node) are placed on a Local Open List and Local Closed list at step 308. In this regard, the Local open list comprises directed nodes that have not yet been examined and the Local closed list comprises directed nodes that have already been examined.

At step 310, a node on the Local Open list is expanded. Once expanded, the system determines if the hidden node can be reached by the Global search at step 312. If the hidden node has already been reached by the Global search, it means the hidden node is no longer hidden and the Local search is cancelled at step 314. Thereafter, the Global search continues at step 304.

If the hidden node has not yet been reached by the Global search, a determination is made regarding whether the Local search can connect to the Global search at step 316. In other words, a determination is made regarding whether there exists any way to continue the path at the current node by switching from the Global path to the Local path. If a connection is not possible, the local search and/or global search may continue at step 310 (and/or step 304). Once a connection between the Global search and Local search has been found, the Local path is added as a Global path at step 318. To add/convert the Local path to a Global path, the Local path is converted to a new Global path and the new Global path is added as an alternative to the Global search. Thereafter, the Local search is complete at step 314 and the Global search continues at step 304.

U-turn Handling

U-turn handling can be divided into two groups: U-turns on a road/street that has its two directions represented by two separate links (both one-way, going in opposite directions) and U-turns on a road/street represented by a single link.

The prior art may not perform any special processing with two link U-turns. Further, the prior art may not even detect a two link U-turn. The validity of a two link U-turn is controlled entirely by the network data (i.e., the turn may be disallowed by a presence of an appropriate turn restriction). Additionally, two link U-turns may often involve more that the two links representing the two directions. For example, a third small connector link between (and perpendicular to) the two ends of the two links may be part of the path.

Single link U-turns (i.e. turns where a node is exited via the same link that was used to reach it) are not allowed in the prior art. While this may represent a slight limitation, cases where a single-link U-turn would be a valid and desirable part of a route calculated and returned to a user are extremely rate.

One case where a single link U turn may be valid under certain conditions is when the U-turn is taken to bypass a turn restriction. For example, a left turn at a particular node may not be allowed. Accordingly, the user turns right and at the first intersection, performs a U-turn, arrives back at the same node, and proceeds straight in the originally desired direction. It is assumed that cases where this kind of a U-turn would be needed are very rare, since the majority of such cases are handled by the loop-back solution described above (where the node is re-entered via a loop-back consisting of several links, rather than a U-turn on one link).

Nonetheless, in one or more embodiments of the invention, turn restriction handling may include the single link U-turn as part of its processing. In such embodiments, the model may be updated to include information about where it is and where it is not legal to make a U-turn. Further, such required data may be provided in the database. As an example, in some countries a U-turn is legal at intersections without lights but it is illegal at controlled intersections. Other countries (may) have other rules. The legality of a U turn at a certain node (or link end) must be available in the model, because the legality of the U-turn may be verified before it is a part of the path suggested to the user.

Advantages and Alternative Embodiments

Many advantages may be gained by using the above-described invention. Actual processing overhead and any additional memory requirements are minimal and the extra processing to handle the turn restriction is local. Further, the extra processing is temporary only. In other words, the extra processing starts when a turn restriction is encountered and finishes as soon as the "turn restriction bypass" is found (usually in just a few steps of the algorithm).

There are several parameters that can be used to modify or provide alternatives to the above methodology, thereby controlling the balance between the resources used to solve the problem and the scope of the cases addressed.

In one or more embodiments, the Local search and Global search may proceed in parallel one step at a time. Further, the Local search can start one or more steps behind the normal search to avoid starting it if a normal/forward search reaches the hidden node in the next few steps. Also, the parallel Local search may proceed at a slower speed (e.g., one step for every two steps of the Global search). Using a slower speed favors finding the forward solution and would use the loop-back solution only if required. Lastly, a maximum number of Local search steps can be specified. Once the maximum number has been reached, the Local search would be abandoned.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, Local area network, or standalone personal computer, could be used with the present invention. In summary, embodiments of the invention provide the ability to find various alternatives for a Global search while effectively analyzing turn restrictions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining a path on a network, comprising:
   (a) commencing a Global search for one or more Global paths on the network;
   (b) determining when a turn restriction on a first node on the network exists;
   (c) detecting a hidden node that is not reachable from the first node due to the turn restriction;
   (d) commencing a Local search from the hidden node in a reverse direction creating a Local search path; and
   (e) when the Local search can connect to the Global search:
      (i) converting the Local search path to a new Global path; and
      (ii) adding the new Global path as an alternative to the Global search.

2. The method of claim 1, wherein the Local search and the Global search proceed in parallel.

3. The method of claim 2, wherein the Local search starts one or more steps behind the Global search.

4. The method of claim 2, wherein the Local search proceeds at a slower speed than the Global search.

5. The method of claim 1, further comprising:
   specifying a maximum number of search steps for the Local search; and
   abandoning the Local search when the maximum number has been reached.

6. The method of claim 1, wherein the Local search keeps track of visited nodes and links that were used to arrive at the visited nodes, to ensure that visited nodes can be revisited using all possible links.

7. The method of claim 1, further comprising abandoning the Local search if the hidden node is found by the Global search.

8. The method of claim 1, further comprising abandoning the Local search.

9. The method of claim 1, wherein detecting a hidden node that is not reachable from the first node due to the turn restriction comprises:
   obtaining an eligible list that comprises a first list of all links that can be used to travel out of the first node;
   obtaining a pending list that comprises a second list of all links that would be applicable to the first node in all other respects except for the turn restriction; and
   determining that a hidden node is not reachable from the first node due to the turn restriction when the pending list is not empty.

10. The method of claim 1, wherein the Local search is conducted in a Local search space, wherein the Local search space comprises:
    a Local open list comprising directed nodes that have not yet been examined; and
    a Local closed list comprising directed nodes that have already been examined.

11. An apparatus for determining a path on a network in computer system comprising:
    (a) a computer system having a memory and a data storage device coupled thereto;
    (b) an application executing on the computer, wherein the application is configured to:
       (i) commence a Global search for one or more Global paths on the network;
       (ii) determine when a turn restriction on a first node on the network exists;
       (iii) detect a hidden node that is not reachable from the first node due to the turn restriction;
       (iv) commence a Local search from the hidden node in a reverse direction creating a Local search path; and
       (v) when the Local search can connect to the Global search:
          (1) convert the Local search path to a new Global path; and
          (2) add the new Global path as an alternative to the Global search.

12. The apparatus of claim 11, wherein the Local search and the Global search proceed in parallel.

13. The apparatus of claim 12, wherein the Local search starts one or more steps behind the Global search.

14. The apparatus of claim 12, wherein the Local search proceeds at a slower speed than the Global search.

15. The apparatus of claim 11, wherein the application is further configured to:
    specify a maximum number of search steps for the Local search; and
    abandon the Local search when the maximum number has been reached.

16. The apparatus of claim 11, wherein the Local search keeps track of visited nodes and links that were used to arrive at the visited nodes, to ensure that visited nodes can be revisited using all possible links.

17. The apparatus of claim 11, wherein the application is further configured to abandon the Local search if the hidden node is found by the Global search.

18. The apparatus of claim 11, wherein the application is further configured to abandon the Local search when the Local search can connect to the Global search.

19. The apparatus of claim 11, wherein the application is configured to detect a hidden node that is not reachable from the first node due to the turn restriction by:
   obtaining an eligible list that comprises a first list of all links that can be used to travel out of the first node;
   obtaining a pending list that comprises a second list of all links that would be applicable to the first node in all other respects except for the turn restriction; and
   determining that a hidden node is not reachable from the first node due to the turn restriction when the pending list is not empty.

20. The apparatus of claim 11, wherein the Local search is conducted in a Local search space, wherein the Local search space comprises:
   a Local open list comprising directed nodes that have not yet been examined; and
   a Local closed list comprising directed nodes that have already been examined.

21. An article of manufacture comprising a program storage medium readable by a computer and embodying one or more instructions executable by the computer to perform a method for determining a path on a network, the method comprising:
   (a) commencing a Global search for one or more Global paths on the network;
   (b) determining when a turn restriction on a first node on the network exists;
   (c) detecting a hidden node that is not reachable from the first node due to the turn restriction;
   (d) commencing a Local search from the hidden node in a reverse direction creating a Local search path; and
   (e) when the Local search can connect to the Global search:
      (i) converting the Local search path to a new Global path; and
      (ii) adding the new Global path as an alternative to the Global search.

22. The article of manufacture of claim 21, wherein the Local search and the Global search proceed in parallel.

23. The article of manufacture of claim 22, wherein the Local search starts one or more steps behind the Global search.

24. The article of manufacture of claim 22, wherein the Local search proceeds at a slower speed than the Global search.

25. The article of manufacture of claim 21, wherein the method further comprises:
   specifying a maximum number of search steps for the Local search; and
   abandoning the Local search when the maximum number has been reached.

26. The article of manufacture of claim 21, wherein the Local search keeps track of visited nodes and links that were used to arrive at the visited nodes, to ensure that visited nodes can be revisited using all possible links.

27. The article of manufacture of claim 21, wherein the method further comprises abandoning the Local search if the hidden node is found by the Global search.

28. The article of manufacture of claim 21, the method further comprises abandoning the Local search when the Local search can connect to the Global search.

29. The article of manufacture of claim 21, wherein detecting a hidden node that is not reachable from the first node due to the turn restriction comprises:
   obtaining an eligible list that comprises a first list of all links that can be used to travel out of the first node;
   obtaining a pending list that comprises a second list of all links that would be applicable to the first node in all other respects except for the turn restriction; and
   determining that a hidden node is not reachable from the first node due to the turn restriction when the pending list is not empty.

30. The article of manufacture of claim 21, wherein the Local search is conducted in a Local search space, wherein the Local search space comprises:
   a Local open list comprising directed nodes that have not yet been examined; and
   a Local closed list comprising directed nodes that have already been examined.

* * * * *

UNITED STATES PATENT AND TRADEMARK OFFICE
CERTIFICATE OF CORRECTION

PATENT NO.       : 7,124,199 B2                                     Page 1 of 1
APPLICATION NO.  : 10/330874
DATED            : October 17, 2006
INVENTOR(S)      : Martin Miller et al.

It is certified that error appears in the above-identified patent and that said Letters Patent is hereby corrected as shown below:

Column 10: Claim 8, line 8, after "search" insert --when the Local search can connect to the Global search--.

Signed and Sealed this

Third Day of July, 2007

JON W. DUDAS
*Director of the United States Patent and Trademark Office*